US012650346B2

(12) United States Patent
Choo

(10) Patent No.: US 12,650,346 B2
(45) Date of Patent: Jun. 9, 2026

(54) TEMPERATURE SENSOR BASED ON A CHARGE-INJECTION CELL ARRANGEMENT

(71) Applicant: ECOLE POLYTECHNIQUE FEDERALE DE LAUSANNE (EPFL), Lausanne (CH)

(72) Inventor: Kyojin Choo, Neuchâtel (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 364 days.

(21) Appl. No.: 18/391,285

(22) Filed: Dec. 20, 2023

(65) Prior Publication Data

US 2024/0210254 A1      Jun. 27, 2024

(30) Foreign Application Priority Data

Dec. 21, 2022      (EP) ..................................... 22215717

(51) Int. Cl.
*G01K 7/00*                (2006.01)
(52) U.S. Cl.
CPC ..................................... *G01K 7/00* (2013.01)
(58) Field of Classification Search
USPC ......... 374/141, 100, 178, 183, 184; 327/512
See application file for complete search history.

(56) References Cited

U.S. PATENT DOCUMENTS

| | | | | |
|---|---|---|---|---|
| 6,236,592 B1 * | 5/2001 | Kramer | .................. | G06N 3/065 |
| | | | | 365/51 |
| 7,936,204 B2 * | 5/2011 | Im | ........................... | G01K 7/01 |
| | | | | 374/170 |
| 10,001,406 B2 * | 6/2018 | Panicacci | .................. | G01J 1/44 |

(Continued)

FOREIGN PATENT DOCUMENTS

WO      WO-2020072581 A1 *   4/2020   ............. H04N 5/378

OTHER PUBLICATIONS

Kyojin D. Choo et al., "Area-Efficient 1GS/s 6b SAR ADC with Charge-Injection-Cell-Based DAC," 2016 IEEE International Solid-State Circuits Conference (ISSCC), (2016).

(Continued)

*Primary Examiner* — Peter J Macchiarolo
*Assistant Examiner* — Mireille S Sadate-Moualeu
(74) *Attorney, Agent, or Firm* — Maschoff Brennan

(57)      ABSTRACT

A charge-injection cell-based temperature sensor (1) is provided. The temperature sensor (1) comprises one or more charge-injection cells (3, 9). The temperature sensor (1) is configured to allow charge to be transferred from one or more source capacitors ($C_{s,n}$, $C_{s,p}$) to one or more output capacitors ($C_{out,n}$, $C_{out,p}$) once transistors (M1, M2, M3, M4) of the charge-injection cells are enabled to allow current to flow through them. The temperature sensor (1) further comprises a temperature sensing unit (7) configured to determine one or more charge-injection cell output voltage values to thereby derive a temperature value from the one or more first charge-injection cell output voltage values.

17 Claims, 5 Drawing Sheets

(56)                References Cited

U.S. PATENT DOCUMENTS

| | | | | |
|---|---|---|---|---|
| 10,594,299 | B1 * | 3/2020 | Veeder | H03H 11/265 |
| 10,594,333 | B1 * | 3/2020 | Choo | H03M 1/466 |
| 11,747,212 | B2 * | 9/2023 | Al-Absi | G01K 7/01 |
| | | | | 374/183 |
| 2009/0046761 | A1 * | 2/2009 | Pan | G01K 13/00 |
| | | | | 374/163 |
| 2010/0001173 | A1 * | 1/2010 | Hanson | G01W 1/08 |
| | | | | 250/214 A |
| 2012/0105132 | A1 * | 5/2012 | Sugiura | G01K 7/01 |
| | | | | 327/512 |
| 2014/0269839 | A1 * | 9/2014 | Tai | G01K 7/34 |
| | | | | 374/184 |
| 2015/0211939 | A1 * | 7/2015 | Hyun | G01K 7/16 |
| | | | | 374/183 |
| 2019/0157970 | A1 * | 5/2019 | Lee | H03K 17/166 |
| 2021/0218393 | A1 * | 7/2021 | Lenhard | H03K 17/693 |

OTHER PUBLICATIONS

Kyojin D. Choo, et al., "Energy-Efficient Low-Noise CMOS Image Sensor with Capacitor Array-Assisted Charge-Injection SAR ADC for Motion-Triggered Low-Power IoT Applications," 2019 IEEE International Solid-State Circuits Conference—(ISSCC), (2019).

Kyojin David Choo, et al., "Energy-Efficient Motion-Triggered IoT CMOS Image Sensor With Capacitor Array-Assisted Charge-Injection SAR ADC," IEEE Journal of Solid-State Circuits, (2019).

Kyojin Choo, et al., "14.1-ENOB 184.9dB-FoM Capacitor-Array-Assisted Cascaded Charge-Injection SAR ADC," 2021 IEEE International Solid-State Circuits Conference (ISSCC), (2021).

* cited by examiner

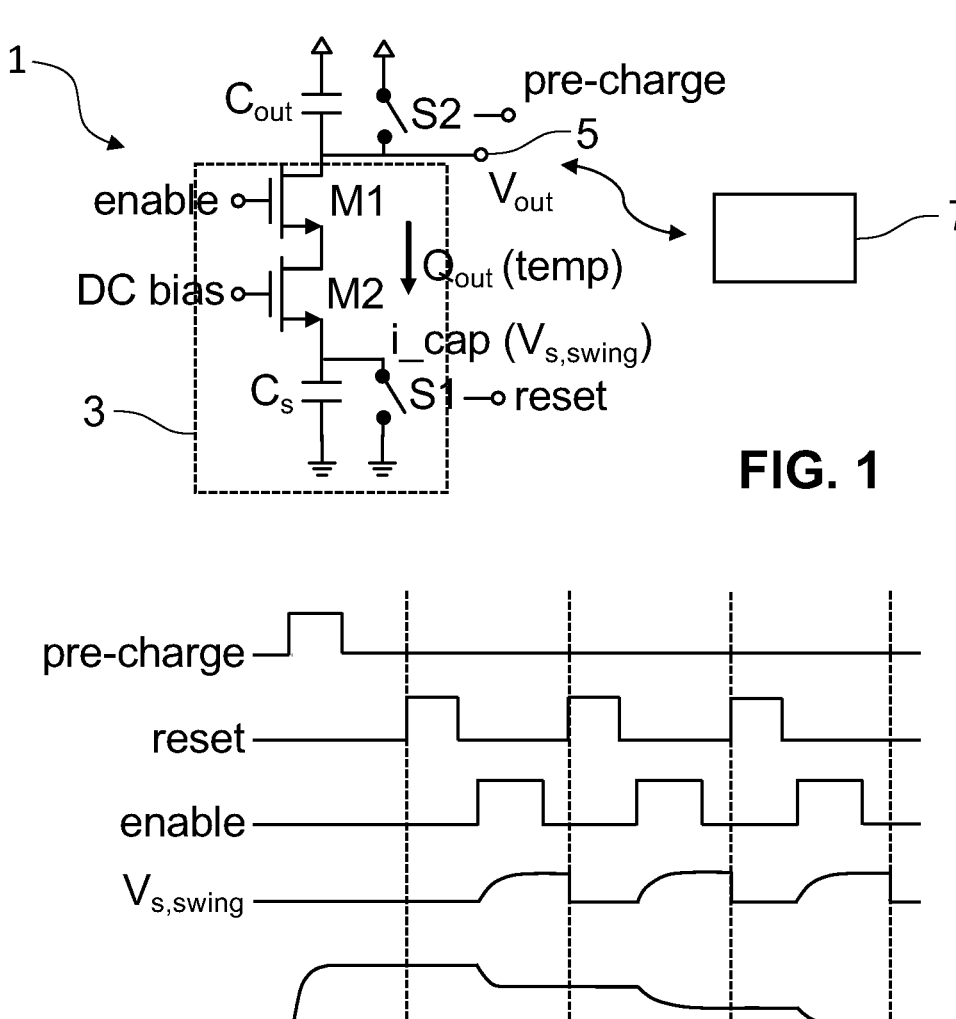
FIG. 1
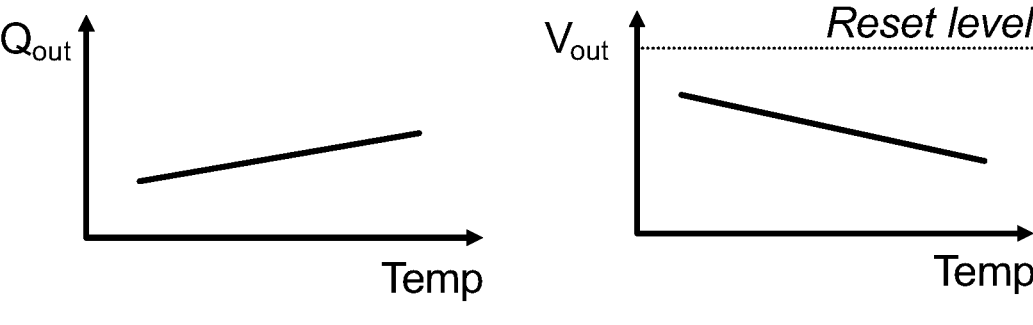
FIG. 2
FIG. 3

TEMPERATURE SENSOR BASED ON A CHARGE-INJECTION CELL ARRANGEMENT

TECHNICAL FIELD

The present invention relates to a temperature sensor which is implemented by using a charge injection-cell arrangement. More specifically, the charge-injection cell arrangement comprises one or more charge-injection cells. The present invention also relates to a temperature sensing method using a charge-injection cell arrangement.

BACKGROUND OF THE INVENTION

A temperature sensor is an electronic device that is configured to measure the temperature of its environment and to convert the input data into electronic data to record, monitor, or signal temperature changes. Many different types of temperature sensors exist. Temperature sensors may be based on bipolar junction transistors (BJTs), metal-oxide-semiconductor field-effect transistors (MOSFETs), micro-electromechanical systems (MEMS), or thermal diffusion devices. However, many state-of-the-art temperature sensors are not particularly compact, and/or they are based on static current-consuming elements (such as BJTs, MOSFETs, etc.), which negatively affects their energy efficiency.

Charge-injection cells (ci-cells) have been proposed and used as digital-to-analogue converter (DAC) elements in the context of designing analogue-to-digital converter (ADC) elements. Charge-injection cells are electronic circuits comprising an arrangement of transistors and capacitors, and which are configured to output a packet of charge each time the circuit is activated and is reset after each activation allowing it to be reused. Charge-injection cells have been proposed to be used for example in image sensors.

SUMMARY OF THE INVENTION

It is an object of the present invention to overcome at least some of the problems identified above related to temperature sensors. More specifically, one of the objects of the present invention is to propose a temperature sensor comprising one or more charge-injection cells.

According to a first aspect of the invention, there is provided a temperature sensor as recited in claim 1.

The proposed sensor offers several advantages. For example, the charge-injection cells of the sensor operate fully dynamically. This means that the energy efficiency of the sensor is extremely high. Furthermore, the charge-injection cells contain only a few transistors and small capacitors, making it a very compact solution.

According to a second aspect of the invention, there is provided a method for sensing temperature according to claim 15.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which:

FIG. 1 schematically shows a charge-injection cell circuit arrangement forming a temperature sensor according to a first example embodiment of the present invention;

FIG. 2 is a signal diagram depicting some signals present in the circuit arrangement of FIG. 1;

FIG. 3 shows how transferred charge and output voltage levels depend on temperature in the circuit arrangement of FIG. 1;

DETAILED DESCRIPTION OF EMBODIMENTS OF THE INVENTION

Figures 4, 5:
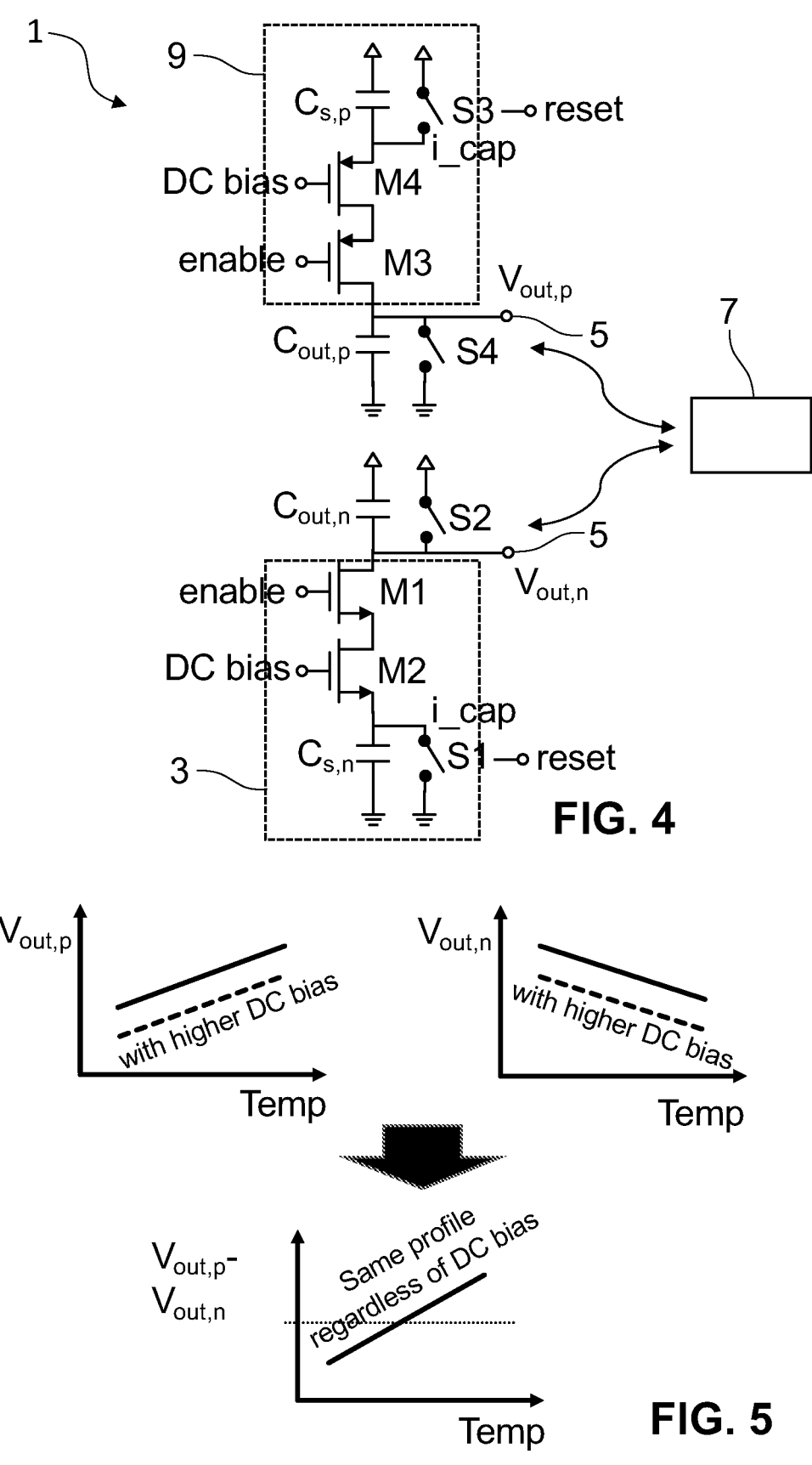
FIG. 4 schematically shows a charge-injection cell circuit arrangement that may be used in a temperature sensor according to a second example embodiment of the present invention.
FIG. 5 shows how output voltage levels depend on temperature in the circuit arrangement of FIG. 4.

Some embodiments of the present invention will now be described in detail with reference to the attached figures. As utilised herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." Furthermore, the term "comprise" is used herein as an open-ended term. This means that the object encompasses all the elements listed, but may also include additional, unnamed elements. Thus, the word "comprise" is interpreted by the broader meaning "include", "contain" or "comprehend". Identical or corresponding functional and structural elements which appear in the different drawings are assigned the same reference numerals. It is to be noted that the use of words "first", "second" and "third", etc. may not imply any kind of particular order or hierarchy unless this is explicitly or implicitly made clear in the context.

The present invention proposes a new charge-injection cell circuit arrangement or circuitry, which is used as a DAC element in the context of designing an ADC element. More specifically, the present invention proposes to use the new charge-injection cell circuitry in a temperature sensor context (different from ADC). It operates based on a different principle compared with other temperature sensors based on BJTs, MOSFETs, MEMS, or thermal diffusion devices.

FIG. 1 schematically illustrates a temperature sensor 1 according to the first example embodiment. The main component of the sensor circuitry 1 is a charge-injection cell, which in this example is a pull-down charge injection cell 3. The structure and operation of the pull-down charge-injection-cell 3 is next explained in more detail. The charge-injection cell 3 comprises a first switch S1 configured to isolate the charge source (source capacitor $C_s$) from an output node 5 and to reset the charge source. More specifically, the charge-injection cell 3 comprises a transistor arrangement, which in this example comprises a first transistor M1, a second transistor M2, and a source capacitor $C_s$ (also known as a charge capacitor). The first transistor M1 is electrically coupled in series with the second transistor M2. The source capacitor $C_s$ is electrically coupled to a node interconnecting the second transistor M2 and the first switch S1. The second transistor M2 is in this example a biasing transistor interconnected between the first transistor M1 and the source capacitor $C_s$, such that the biasing transistor M2 is in a cascaded arrangement with the first transistor M1. The magnitude of the charge transferred by the charge-injection cell directly correlates with the voltage applied to the control terminal of the biasing transistor M2. The output node 5 is electrically coupled to an output capacitor $C_{out}$ and to a second switch S2, which can selectively reset the output capacitor $C_{out}$. In the pull-down charge-injection-cell 3, the source capacitor is coupled to a low electric potential level, i.e., in this example the source capacitor $C_s$ is grounded. The output capacitor $C_{out}$ on the other hand is coupled to a high electric potential level, i.e., in this case the output capacitor is connected to a supply voltage source. In this example, in the pull-down charge-injection cell, the first and second transistors M1, M2 are n-type MOSFETs.

When operating the pull-down charge-injection cell 3 and as also depicted in the signal diagram of FIG. 2, the enable signal or pulse (also known as an activation signal) controlling the conductivity of the first transistor M1 pulses high to transfer or inject charge from the source capacitor to the output capacitor, where the amount of transferred charge is temperature-dependent. During each injection, the voltage $V_{s,swing}$ at a node i_cap rises from its reset value (ground) to the voltage controlled by the signal applied to the control terminal of the biasing transistor M2, whose value sets the charge-injection amount. In FIG. 2, the pre-charge signal refers to the control signal of the second switch S2, which at the beginning of the process is reset by closing and opening the second switch indicated by the rising and falling of the pre-charge signal.

Before charge injection, the output capacitor $C_{out}$ is thus first reset (i.e., it is set to a known electric potential) and then released. This is done by closing and opening the second switch S2. Subsequently or simultaneously, the source capacitor $C_s$ is reset and then released as controlled by the reset signal. Subsequently, the enable pulse rises to turn on the first transistor M1. Current can now conduct through the first and second transistors M1, M2 to charge the source capacitor $C_s$ to a higher voltage, creating a swing at the node i_cap (i.e., at the interconnection point linking the second transistor M2, the source capacitor $C_s$ and the first switch S1). The enable pulse then falls to turn off the first transistor M1. As a result, the pull-down charge-injection cell 3 outputs a charge package that is defined by $Q_{out}=C_s \times V_{s,swing}$, where $V_{s,swing}$ is temperature-dependent. A charge-injection cell activation cycle has now been completed. This process can be repeated to run further activation cycles preferably without resetting the output capacitor $C_{out}$ to get more charge output.

The charge-injection cell 3 employs a unique unidirectional transfer of charge as opposed to the bidirectional charge sharing in a conventional capacitor DAC. The charge-injection cell injects a temperature-dependent amount of charge to the output capacitor $C_{out}$ when enabled. To achieve this, the charge-injection cell 3 is used as a unidirectional switch to isolate the charge source (i.e., the source capacitor $C_s$) from the sensor output with high output impedance. In this way, the charge-injection cell 3 will only ever transfer charge from its source capacitor when enabled by the first and second transistors M1, M2.

$Q_{out}$ of the charge-injection cell 3 is a linear function of temperature because the threshold voltage $V_{th}$ of the transistors is modulated by temperature (lower $V_{th}$ for higher temp and vice versa). For this reason, $Q_{out}$ (or $V_{out}$ after an arbitrary number of activations after reset) exhibits (linear) temperature dependence as shown in FIG. 3. The capacitance value of the output capacitor $C_{out}$ may be much smaller (e.g. 1 to 100 times) than the capacitance value of the source capacitor $C_s$ to make this linear dependence steeper slope (V/temperature). However, this does not have to be the case, and in some configurations, the capacitance value of the output capacitor $C_{out}$ may be greater than the capacitance value of the source capacitor $C_s$.

The sensor 1 also comprises a temperature sensing unit 7 operatively coupled to the output node 5 and configured to measure the output voltage of the charge-injection cell 3 to thereby derive a temperature value from the output voltage of the charge-injection cell 3.

The circuit diagram of FIG. 4 illustrates the second embodiment of the present invention. In this case, the sensor circuitry 1 comprises two main circuit components or portions, namely a pull-down charge-injection cell 3 and a pull-up charge injection cell 9. The pull-down charge-injection cell 3 of the configuration of FIG. 4 is identical or substantially identical to the configuration of FIG. 1. The source capacitor of the pull-down charge-injection cell is now referred to as a first source capacitor $C_{s,n}$, the output capacitor is now referred to as a first output capacitor $C_{out,n}$ and the output node is now referred to as a first output node.

The pull-up charge-injection cell 9 comprises a third switch S3 configured to isolate the charge source (source capacitor $C_{s,p}$) from a second output node 5 and to reset the charge source. The pull-up charge-injection cell 9 further comprises a third transistor M3, a fourth transistor M4 and a second source capacitor $C_{s,p}$. The third transistor M3 is electrically coupled in series with the fourth transistor M4. The second source capacitor $C_{s,p}$ is electrically coupled to a node interconnecting the fourth transistor M4 and the third switch S3. The fourth transistor M4 is in this example a biasing transistor interconnected between the third transistor M3 and the second source capacitor $C_{s,p}$, such that the biasing transistor M4 is in a cascaded arrangement with the third transistor M3. The magnitude of the charge transferred by the pull-up charge-injection cell 9 directly correlates with the voltage applied to the control terminal of the biasing transistor M4. The second output node 5 is electrically coupled to a second output capacitor $C_{out,p}$ and to a fourth switch S4, which can selectively reset the second output capacitor $C_{out,p}$. It is to be noted that all the switches mentioned in the present description may be implemented as transistors. In the pull-up charge-injection-cell 9, the second source capacitor $C_{s,p}$ is coupled to a high electric potential level, i.e., in this case the second source capacitor is connected to a supply voltage source. The second output capacitor $C_{out,p}$ on the other hand is coupled to a low electric potential level, i.e., in this example the second output capacitor $C_{out,p}$ is grounded. In this example, in the pull-up charge-injection cell 9, the third and fourth transistors M3, M4 are p-type MOSFETs. In view of the above description, the pull-down and pull-up charge-injection cells 3, 9 thus have opposite polarities.

The operation of the pull-up charge-injection cell 9 follows the principles of the pull-down charge injection cell 3 and is for this reason not described in detail in this context. Furthermore, in the circuit configuration of FIG. 4, the pull-down charge-injection cell 3 and the pull-up charge injection cell 9 may operate independently. For example, the number or activation cycles of these two cells 3, 9 may or may not be the same. However, from an implementation point of view, it would be easier if the two cells are activated equal number of times.

By introducing both the pull-down charge-injection cell 3 and pull-up charge-injection cell 9 as shown in FIG. 4, their direct current (DC) bias dependence can be sufficiently cancelled out by taking the output of the circuitry as the difference between the first and second output voltage values: $V_{out,p} - V_{out,n}$. In the circuitry of FIG. 4, both the pull-down and pull-up charge injection cells 3, 9 are connected to the same DC bias source. Both the charge-injection cells are activated arbitrary number of times to output charge onto their respective output capacitor, in this case simultaneously. The two output voltages formed at the output capacitors $C_{out,n}$, $C_{out,p}$ are subtracted from each other to yield a temperature-dependent voltage. Assuming the DC bias can be different due to chip-to-chip variations, however, the complementary action of the pull-down and pull-up charge injection cells 3, 9 cancels that variation and yields a stable temperature-dependent differential voltage output absent of the DC bias dependence as also illustrated in FIG. 5.

Figure 6:
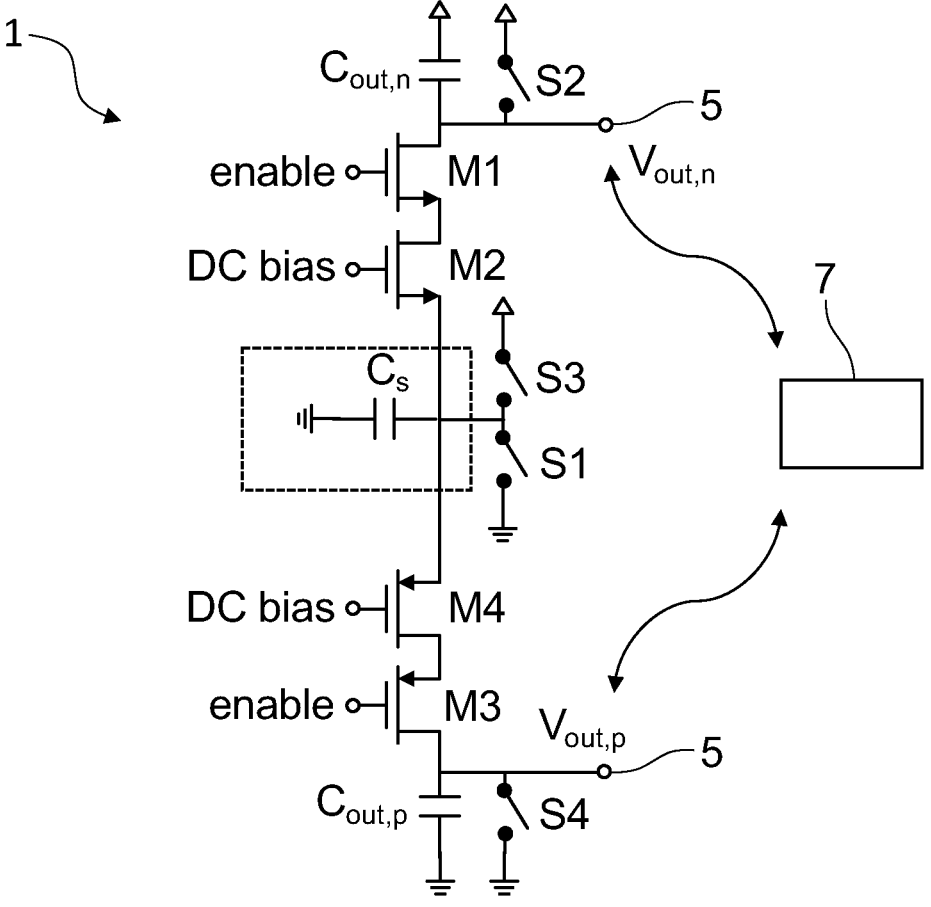
FIG. 6 schematically shows a charge-injection cell circuit arrangement that may be used in a temperature sensor according to a third example embodiment of the present invention.

FIG. 6 illustrates the third embodiment of the present invention. The difference between the circuit configuration of FIG. 6 and the one of FIG. 4 is the shared source capacitor $C_s$. In other words, in the circuit configuration of FIG. 6, the single source capacitor $C_s$ is shared between the pull-down and pull-up charge injection cells 3, 9. As the source capacitor $C_s$ is usually larger than the output capacitors $C_{out,n}$, $C_{out,p}$, sharing the source capacitor between the pull-down charge-injection cell 3 and the pull-up charge-injection cell 9 can significantly save chip area. In this scenario, the pull-up charge-injection cell and the pull-down charge-injection cell are activated sequentially. This means that once the pull-down charge-injection cell 3 is active, the pull-up charge-injection cell is inactive, or vice versa. In other words, in this case, the first and third switches S1, S3 are not closed, in other words electrically conductive, at the same time. The source capacitor $C_s$ is reset either to a low/high voltage depending on whether the pull-down/pull-up charge-injection cell is being activated next. More specifically, the source capacitor $C_s$ is reset to a high voltage value if the pull-up charge-injection cell 9 is activated next, and to a low voltage value if the pull-down charge-injection cell 3 is activated next. When the source capacitor is reset, then the respective first or third switch S1, S3 is closed. In the configuration of FIG. 6, the node of the source capacitor $C_s$ that is not electrically coupled to the switch is at a low voltage level, for instance grounded, as shown in the figure, or at another substantially fixed electric potential.

In the circuit configuration of FIG. 6, both the pull-down and pull-up charge-injection cells 3, 9 are connected to the same DC bias, in the similar manner as in the circuit configuration of FIG. 4, but now the source capacitor $C_s$ is being shared for the two different polarities of the charge-injection cells. Both the charge-injection cells are activated arbitrary number of times to output charge onto their respective output capacitor $C_{out,n}$, $C_{out,p}$ in a sequential manner. The source capacitor $C_s$ is reset to opposite polarities depending on which operational mode (i.e., the pull-down or pull-up operation) is used next. The two voltages formed at the output capacitors, i.e., at the output nodes 5 nodes, are subtracted from each other to yield a temperature-dependent voltage similar to the scenario shown in FIG. 4. Assuming the DC bias can be different due to chip-to-chip variations, however, the complementary action of the pull-down and pull-up charge-injection cells cancels that variation and yields a stable temperature-dependent differential voltage output absent of the DC bias dependence.

Figure 7:
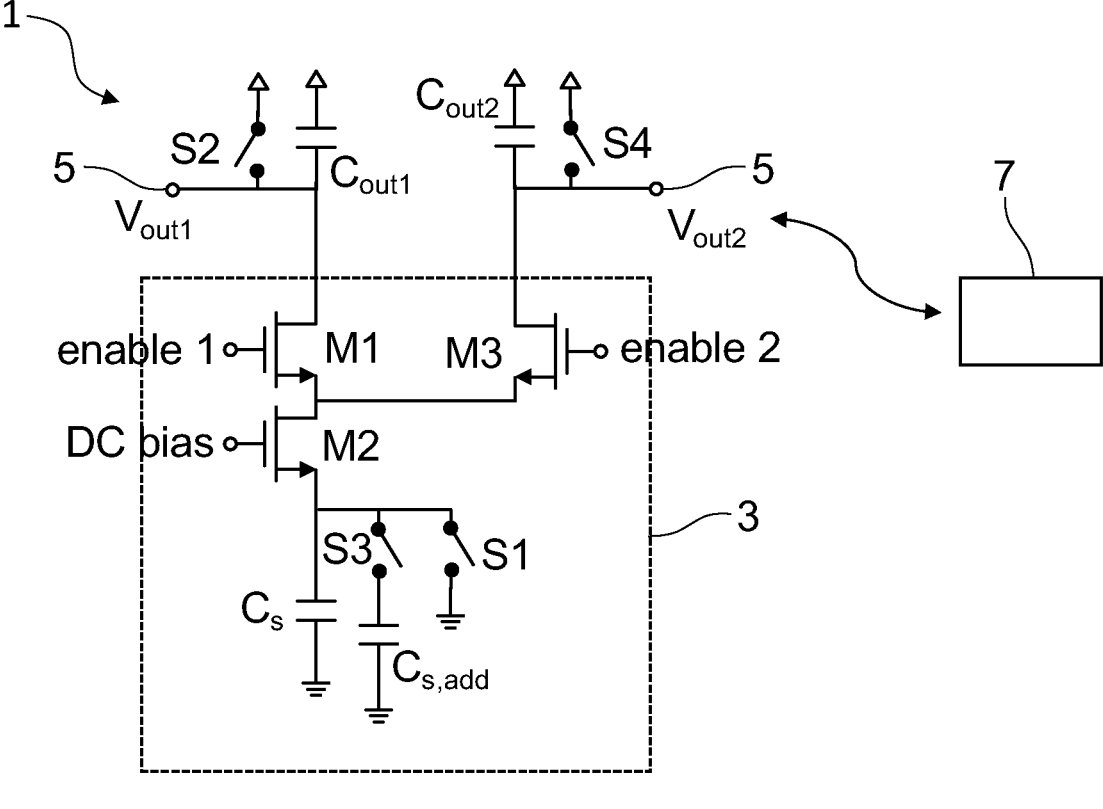
FIG. 7 schematically shows a charge-injection cell circuit arrangement that may be used in a temperature sensor according to a fourth example embodiment of the present invention.

The circuit configuration of FIG. 7 illustrates the fourth embodiment of the present invention. In this example, a pull-down charge-injection cell 3 is shown, although, the circuit could instead be a pull-up charge-injection cell 9. As shown, the charge-injection cell 3 comprises two source capacitors (i.e., first and second source capacitors), namely an original source capacitor $C_s$ and an additional source capacitor $C_{s,add}$. The capacitance value of the additional source capacitor $C_{s,add}$ increases capacitance value by adding capacitance to the original source capacitor $C_s$. In other words, the original source capacitor ($C_s$) is characterised by a first capacitance value, and the additional source capacitor ($C_{s,add}$) is characterised by a second capacitance value, and the original source capacitor is arranged in parallel with the additional source capacitor and the first switch S1. In this example, the first and second capacitance values are mutually different. The sensor circuitry further comprises first and second output capacitors $C_{out1}$ and $C_{out2}$. Following the principle of the pull-down charge-injection cell of FIG. 1, the first switch S1 is manipulated to reset the source capacitors. The second switch S2 is used to reset the first output capacitor $C_{out1}$. In this example, the third switch S3 is used to electrically disconnect the additional source capacitor from the rest of the charge-injection cell. The fourth switch S4 is used to reset the second output capacitor $C_{out2}$. A fifth switch (not shown in FIG. 7) may optionally be provided to electrically disconnect the original source capacitor from the rest of the charge-injection cell. The charge-injection cell further comprises a third transistor which is controlled by a second enable pulse, referred to as enable 2 in FIG. 7. By selectively enabling the third transistor M3, charge can be directed through it to the second output capacitor $C_{out2}$ instead of directing charge to the first output capacitor $C_{out1}$ through the first transistor M1. In other words, the first charge-injection cell 3 is configured to allow charge to be selectively and in an alternating manner transferred from the original source capacitor $C_s$ to the first output capacitor $C_{out1}$ and from the additional source capacitor $C_{s,add}$ to the second output capacitor $C_{out2}$.

While using the same transistor connected to the DC bias, activating the charge-injection cell 3 with a different source capacitor—output capacitor pair (large or small) exhibits different temperature dependence. In this manner, corner variation, also known as process variation, of $V_{th}$ in the first transistor M1 can be cancelled (which is common to both activations) by appropriately selecting coefficients in $V_{out,final} = \alpha V_{out1} + \beta V_{out2}$, where $V_{out,final}$ denotes the final output voltage that is used to derive the temperature. The temperature value can thus be derived from a weighted sum of the first and second charge-injection cell output voltage values. The coefficients $\alpha$ and $\beta$ can be implemented (i.e., to make them different) for example in the following ways: i) by distorting the capacitance ratio between the first and second output capacitors $C_{out1}$ and $C_{out2}$; ii) by converting the first and second output voltages $V_{out1}$ and $V_{out2}$ to digital code and applying digital computation; and/or iii) by applying different activation cycles for the small and large source capacitors (N1 and N2). By implementing the circuit configuration of FIG. 7, the process variations of the first transistor M1 can be cancelled.

According to a fifth embodiment, the transistor arrangement of the respective charge-injection cell comprises only one transistor, i.e., the transistor arrangement is in this case a single-transistor configuration or element. Thus, according to this embodiment, the function of the first and second transistors M1, M2 can be merged into one transistor. Accordingly, it is possible to have only the first transistor M1 (in the respective charge-injection cell) and apply a bias voltage as a pulse to enable/disable the charge-injection cell. In other words, when the pulse is logic high, the value could be "DC bias", and when the pulse is logic low, the value could be "ground voltage" or anything that turns off the transistor. It is also possible to have a sensor circuit configuration, where instead of all the charge-injection cells having a single-transistor arrangement, one of the charge-injection cells has a single-transistor arrangement, while the other charge-injection cell(s) would comprise two transistors.

The above embodiments thus describe a circuit structure called a charge-injection cell, which is used in a temperature sensing element. The circuit involves a transistor stacked on top of a source capacitor (that is initially reset), then the transistor is enabled to a conductive mode to pass the charge from the capacitor to another capacitor that gathers the output charge. The transistors are turned ON and OFF by the voltage level of their respective control signal, such as the enable signal and the DC bias signal, as described above. The voltage at the output capacitor reflects the amount of charge that comes from the source capacitor, and that output charge is defined by the transistor parameters at the final state of the conduction, which is in the sub-threshold region when enough time has been passed. The linear influence of temperature on the BJT-like operation of the transistor in the sub-threshold region is leveraged as a temperature sensing principle.

To summarise the above teachings of the present invention, a charge-injection cell-based temperature sensor 1 is provided. The temperature sensor 1 comprises one or more charge-injection cells 3, 9. The temperature sensor 1 is configured to allow charge to be transferred from one or more source capacitors $C_{s,n}$, $C_{s,p}$ to one or more output capacitors $C_{out,n}$, $C_{out,p}$ once transistor arrangements of the charge-injection cells are enabled to allow current to flow through them. The temperature sensor 1 further comprises a temperature sensing unit 7, which can be an ADC or an amplifier, configured to determine one or more charge-injection cell output voltage values to thereby derive a temperature value from the one or more first charge-injection cell output voltage values.

The nature of operation of this circuit is dynamic (not static). The dynamic operating principle allows several unique features to be exploited when used as a temperature sensing element while still exhibiting proportional-to-absolute temperature characteristics: 1) the power consumption is extremely low as it does not consume static current; 2) the circuit can be configured to significantly reduce the effect of mismatch of transistors used in the charge-injection cell by using the same transistor to be stacked on different capacitors (in the fourth embodiment)—effectively cancelling the transistor mismatch; 3) process corner agnosticism can be achieved by the same principle as under point 2 if a proper ratio of the two outputs are imbued and subtracted from each other; 4) supply voltage agnosticism can be achieved by applying particularly-ratioed complementary versions of the charge-injection cells biased with voltages influenced by the supply voltage. Furthermore, as the charge-injection cells 3, 9 are demonstrated as DAC elements, they can be seamlessly integrated into an ADC.

Figure 8:
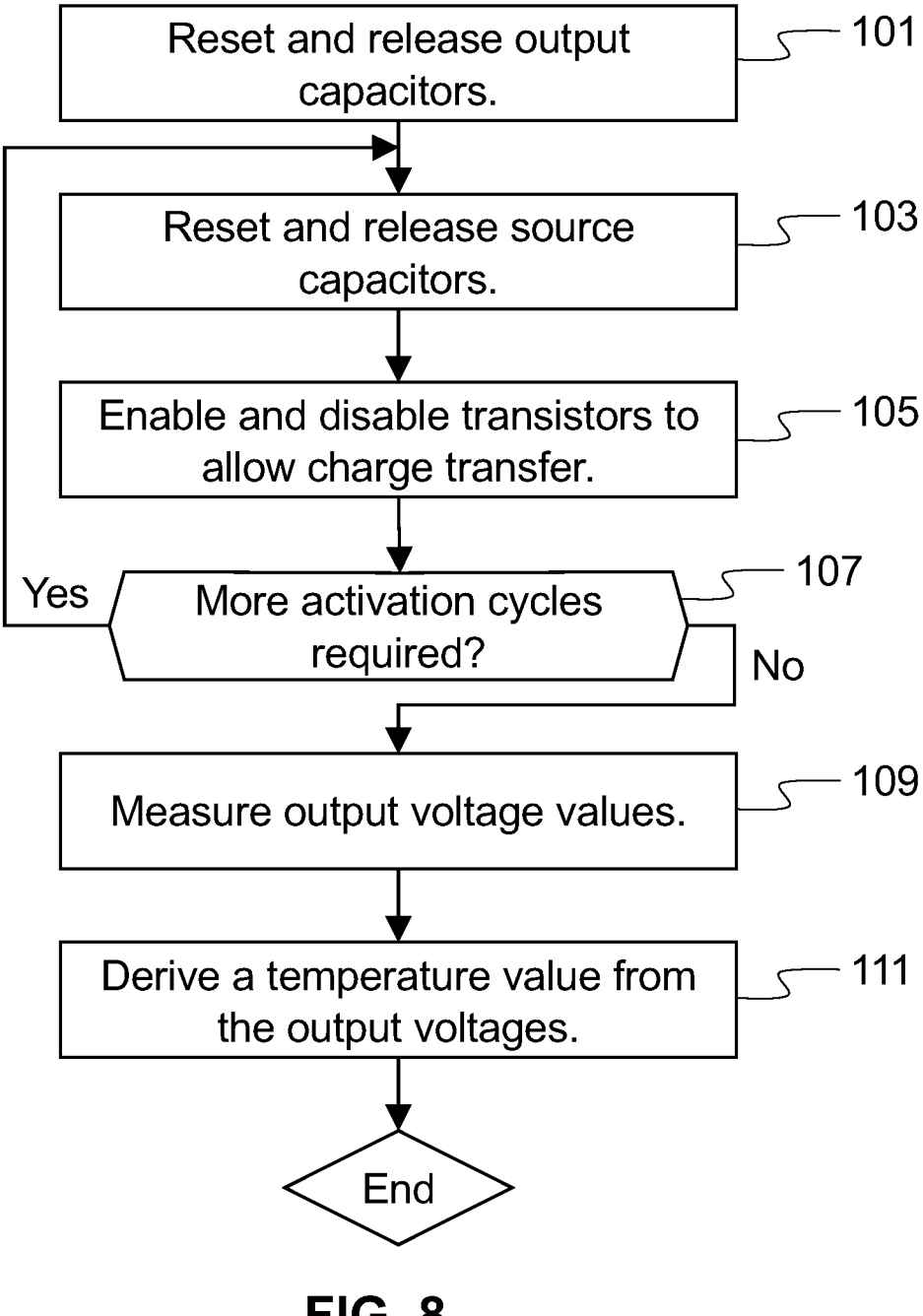
FIG. 8 is a flow chart illustrating the process of operating the circuit arrangement of FIG. 4.

The flow chart of FIG. 8 summarises the process of operating the temperature sensor 1 of FIG. 4 or 6. Initially all the switches are open, i.e., they are not electrically conductive. In step 101, the output capacitors $C_{out,n}$, $C_{out,p}$ are reset and released by closing and opening the second and fourth switches S2, S4. Simultaneously, or subsequently, in step 103, the source capacitors $C_{s,n}$, $C_{s,p}$ are reset and released by closing and opening the first and third switches S1, S3. In step 105, the first to fourth transistors M1, M2, M3, M4 are enabled and disabled by feeding the respective enable pulse to the gate node of the first and third transistors M1, M3 to allow charge transfer from the source capacitors to the output capacitors. In step 107 it is determined whether or not more charge-injection activation cycles are needed. In the affirmative, the process continues in step 103 and the source capacitors $C_{s,n}$, $C_{s,p}$ are repeatedly reset and released (but not necessary at regularly occurring intervals), and the transistors are repeatedly enabled and disabled (but not necessary at regularly occurring intervals). If no further activation cycles are required, then the process continues in step 109, where output voltage values are measured at the output nodes 5 of the temperature sensor 1. In step 111, the temperature value is derived from the measured output voltage values. In this case, the output voltage of the temperature sensor linearly depends on the ambient temperature, i.e., the temperature where the temperature sensor is placed. It is to be noted that step 107 also covers a scenario where the charge-injection cells are activated for a predetermined or preset number of times. In this case, in step 107 the algorithm simply verifies whether or not the preset number of activations cycles have been completed.

While the invention has been illustrated and described in detail in the drawings and foregoing description, such illustration and description are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims. Further variants may be obtained by combining the teachings of any of the designs explained above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A charge-injection cell-based temperature sensor, the temperature sensor comprising:

a first charge-injection cell comprising a first transistor arrangement, a first switch and a first source capacitor electrically coupled to a node interconnecting the first transistor arrangement and the first switch, the first transistor arrangement being electrically coupled to a first charge-injection cell output node for measuring a first charge-injection cell output voltage value;

a first output capacitor in series with the first transistor arrangement;

a second switch in parallel with the first output capacitor and electrically coupled to the first transistor arrangement, an interconnection node between the first transistor arrangement, the first output capacitor and the second switch forming the first charge-injection cell output node, the first and second switches being configured to be selectively manipulated to reset the first source capacitor and the first output capacitor, respectively, and the temperature sensor being configured to allow charge to be transferred from the first source capacitor to the first output capacitor once the first transistor arrangement is enabled to allow current to flow through it; and a temperature sensing unit configured to determine the first charge-injection cell output voltage value to thereby derive a temperature value from at least the first charge-injection cell output voltage value.

2. The temperature sensor according to claim 1, wherein the first transistor arrangement comprises a first transistor and a second transistor in series with the first transistor, wherein the first source capacitor is electrically coupled to a node interconnecting the second transistor and the first switch, wherein the first transistor is electrically coupled to the first charge-injection cell output node, and wherein the temperature sensor is configured to allow charge to be transferred from the first source capacitor to the first output capacitor once the first and second transistors are enabled to allow current to flow through them.

3. The temperature sensor according to claim 1, wherein the temperature sensor further comprises a second charge-injection cell, a second output capacitor in series with the second charge-injection cell, and a second charge-injection cell output node for measuring a second charge-injection cell output voltage value, in operation the temperature sensor being configured to allow charge to be transferred from the first source capacitor or from a second source capacitor to the second output capacitor, wherein the first charge-injection cell has a first polarity, and the second charge-injection cell has a second, different polarity, and wherein the temperature sensing unit is configured to further read the second charge-injection cell output voltage value to thereby derive the temperature value from the difference between the first and second charge-injection cell output voltage values.

4. The temperature sensor according to claim 3, wherein the first source capacitor is shared between the first and second charge-injection cells.

5. The temperature sensor according to claim 4, wherein when the first charge-injection cell is configured to be active and transfer charge between the first source capacitor and the first output capacitor, then the second charge-injection cell is configured to be inactive, and wherein when the first charge-injection cell is configured to be inactive, then the second charge-injection cell is configured to be active and transfer charge between the first source capacitor and the second output capacitor.

6. The temperature sensor according to claim 3, wherein in the first charge-injection cell, the first source capacitor is electrically coupled to a low voltage level and the first output capacitor is electrically coupled to a high voltage level, and in the second charge-injection cell, the second source capacitor or the first source capacitor is electrically coupled to a high voltage level, and the second output capacitor is electrically coupled to a low voltage level, or wherein in the first charge-injection cell, the first source capacitor is electrically coupled to a high voltage level and the first output capacitor is electrically coupled to a low voltage level, and in the second charge-injection cell, the second source capacitor or the first source capacitor is electrically coupled to a low voltage level, and the second output capacitor is electrically coupled to a high voltage level.

7. The temperature sensor according to claim 3, wherein the second charge-injection cell further comprises a second transistor arrangement and a third switch, wherein the second source capacitor is electrically coupled to a node interconnecting the second transistor arrangement and the third switch, the second transistor arrangement being electrically coupled to the second charge-injection cell output node, wherein the second output capacitor is in series with the third transistor, wherein the sensor further comprises a fourth switch in parallel with the second output capacitor and electrically coupled to the second transistor arrangement, an interconnection node between the second transistor arrangement, the second output capacitor and the fourth switch forming the second charge-injection cell output node, wherein the third and fourth switches are configured to be selectively manipulated to reset the second source capacitor and the second output capacitor, respectively, and wherein the temperature sensor is configured to allow charge to be transferred from the second source capacitor to the second output capacitor once the second transistor arrangement is enabled to allow current to flow through it.

8. The temperature sensor according to claim 7, wherein the second transistor arrangement comprises a third transistor and a fourth transistor in series with the third transistor, wherein the second source capacitor is electrically coupled to a node interconnecting the fourth transistor and the third switch, wherein the third transistor is electrically coupled to the second charge-injection cell output node, and wherein the temperature sensor is configured to allow charge to be transferred from the second source capacitor to the second output capacitor once the third and fourth transistors are enabled to allow current to flow through them.

9. The temperature sensor according to claim 8, wherein the first charge-injection cell further comprises at least a third switch arranged to selectively electrically decouple at least one of the two source capacitors from the first transistor arrangement.

10. The temperature sensor according to claim 3, wherein the first and second charge-injection cells are configured to be activated an equal number of times.

11. The temperature sensor according to claim 1, wherein the first charge-injection cell comprises two source capacitors with mutually different capacitance values, wherein the temperature sensor comprises two output capacitors and two charge-injection cell output nodes for measuring the first charge-injection cell output voltage value and a second charge-injection cell output voltage value, wherein the temperature sensor is configured to allow charge to be transferred in an alternating manner from the two source capacitors to the respective output capacitor, and wherein the temperature sensor is configured to derive the temperature value from at least the first and second charge-injection cell output voltage values.

12. The temperature sensor according to claim 11, wherein the temperature sensor is configured to derive the temperature value from a weighted sum of the first and second charge-injection cell output voltage values.

13. The temperature sensor according to claim 11, wherein the first charge-injection cell further comprises a second transistor arrangement arranged in parallel with the first transistor arrangement and interconnected between the first transistor arrangement and one of the output capacitors, and wherein the first and second transistor arrangements are configured to be selectively enabled to allow charge to be selectively transferred from the respective source capacitor to the respective output capacitor.

14. The temperature sensor according to claim 1, wherein the capacitance value of the first source capacitor is greater than the capacitance value of the first output capacitor and/or the second output capacitor.

15. A method for sensing temperature by using a charge-injection cell-based temperature sensor, wherein the temperature sensor comprises a first charge-injection cell comprising a first transistor arrangement, a first switch and a first source capacitor electrically coupled to a node interconnecting the first transistor arrangement and the first switch, the first transistor arrangement being electrically coupled to a first charge-injection cell output node for measuring a first charge-injection cell output voltage value, the temperature sensor further comprising a first output capacitor in series with the first transistor arrangement, and a second switch in parallel with the first output capacitor and electrically coupled to the first transistor arrangement, an interconnection node between the first transistor arrangement, the first output capacitor and the second switch forming the first charge-injection cell output node, the method comprising the steps of:

resetting and releasing the first output capacitor by manipulating the second switch;

resetting and releasing the first source capacitor by manipulating the first switch;

enabling for a given duration the first transistor arrangement to allow charge to be transferred from the first source capacitor to the first output capacitor;

determining the first charge-injection cell output voltage value at the first charge-injection cell output node; and deriving a temperature value from at least the first charge-injection cell output voltage value.

16. The method according to claim 15, wherein the step of resetting and releasing the first source capacitor and the step of enabling the first transistor arrangement are carried out repeatedly to allow a plurality of charge-injection cell activation cycles.

17. The method according to claim 15, wherein the temperature sensor comprises two charge-injection cells with opposite polarities and two charge-injection cell output nodes for measuring the first charge-injection cell output voltage value and a second charge-injection cell output voltage value, and wherein the method further comprises determining the first and second charge-injection cell output voltage values, and deriving the temperature value from the difference between the first and second charge-injection cell output voltage values.

\* \* \* \* \*